United States Patent [19]

Siclari et al.

[11] 3,764,585

[45] Oct. 9, 1973

[54] METHOD FOR THE PRODUCTION OF SYNTHETIC POLYAMIDES, WHICH COMPRISES ADDING AN AROMATIC ALDEHYDE CONTAINING SULFONIC ACID GROUPS TO THE REACTING MONOMERS

[75] Inventors: Francesco Siclari, Barlassina; Pierluigi Perazzoni, Palazzolo Milanese; Pier Giorgio Silvestroni, Cesano Maderno, all of Italy

[73] Assignee: Snia Viscosa Societa Nazionale Industria Applicazioni Viscosa S.p.A., Milan, Italy

[22] Filed: May 3, 1972

[21] Appl. No.: 249,786

[30] Foreign Application Priority Data
May 7, 1971   Italy.............................. 24251 A/71

[52] U.S. Cl..................... 260/72 N, 8/168, 8/178 R, 260/29.4 R, 260/37 N, 260/78 L
[51] Int. Cl............................ C08g 9/04, C08g 9/24
[58] Field of Search............... 260/78 A, 72 R, 72 N

[56] References Cited
UNITED STATES PATENTS

| 2,371,997 | 3/1945 | Hoover et al..................... 260/72 N |
| 3,579,483 | 5/1971 | Twilley et al..................... 260/78 A |

OTHER PUBLICATIONS
Chem–Abstracts, Vol. 74, 1971, 127418a, Feb. 25, 1971, Siclari et al.

Primary Examiner—Howard E. Schain
Attorney—B. Edward Shlesinger et al.

[57] ABSTRACT

A method for obtaining synthetic polyamide yarns, more particularly polyamide yarns, is disclosed, which have a high affinity towards basic dyestuffs. The dyeability with basic dyestuffs is improved by adding to the polymerization mass, prior to, or during progress of, polymerization, an aromatic aldehyde having the general formula

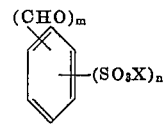

wherein $m$ and $n$ are integers which are 1 or 2, the group $SO_3X$ indicates both a free sulphonic group or such a group salified with a member selected from the group consisting of ammonium ions, alkali metals and alkaline earth metals.

Hypophosphorous acid, or an alkali metal salt thereof can also be added to improve the whiteness of the parts of the yarn or fabric which are not to be dyed.

11 Claims, No Drawings

METHOD FOR THE PRODUCTION OF SYNTHETIC POLYAMIDES, WHICH COMPRISES ADDING AN AROMATIC ALDEHYDE CONTAINING SULFONIC ACID GROUPS TO THE REACTING MONOMERS

This invention relates to a method for the production of synthetic polymer yarns, and more particularly polyamide yarns having a high affinity towards basic dyestuffs, and to spinnable polymers obtained with said method for the production of such yarns.

More particularly, the spinnable polyamides as obtained with the method according to the invention are either polyamides or copolyamides with a high molecular weight and a high melting point and are thus adapted to the production of threads and yarns. Such polyamides and copolyamides can be prepared by polymerization of lactams and their derivatives, more particularly epsilon-caprolactam, or, as an alternative, by reacting diamines with bicarboxylic acids (or derivatives thereof) until obtaining a polymer which can be converted into a thread or yarn as well known in the appertaining art.

The invention also comprises the production of other synthetic polymers such as polyesters and others. The threads obtained with such polymers are generally devoid of any affinity towards the basic dyestuffs, due to their own nature.

The yarns as produced with the polyamides of the prior art, in addition to possessing to a degree the well known mechanical and textile properties, display a good dyeability towards the acidic dyestuffs, said dyeability being, moreover, susceptible of being improved by the use of particular additives, but they display no affinity towards the basic dyestuffs.

It is known in the dyeing art that the acidic dyestuffs, even permitting a good dyeability for the purposes which are most commonly aimed at, do not allow the obtention, in the fibres as obtained with the above indicated polyamides, a very intense and brilliant colour, as can be conversely obtained with the basic dyestuffs: furthermore, the latter are available over a wider colour spectrum. In the case in which it is desired to obtain a fabric having areas coloured with different hues, such as a fabric having alternated strips of blue, red or otherwise, such an object cannot be achieved with dyestuffs having an acidic character, but dyestuffs having a basic nature must also be resorted to.

It would thus be an asset to have both fibres dyeable with acidic dyestuffs and fibres dyeable with basic dyestuffs, so that, by properly arraying the fibres in said areas or stripes of the fabric, the different fibres may take the hue selectively in the subsequent treatment baths, such as acidic and basic (or in a single bath), consistently with their affinities, and, more exactly the fibres having an affinity towards the acidic dyestuffs absorb the acidic dyestuffs in a more or less intense manner, the same being true for the fibres having an affinity towards the basic dyestuffs. The prior art has already suggested additives which impart to polyamides a certain affinity towards the basic dyestuffs. Such additives, in addition to possessing the prerequisite of imparting to the fibre the capacity of absorbing and firmly retaining the basic dyestuffs during the dyeing process, must also be endowed with the property of being compatible with the polyamides at the high temperatures which are required for polymerization and spinning, without producing lumps and/or other defects in the polymer mass, which could be attributed to unevenness of their distribution throughout the mass itself. In addition, such additives must be soluble in the aqueous solutions or easily dispersable in the lactam solutions or, anyhow, in the starting monomers to be polymerized, and, in addition, they must also be soluble in the obtained polymers. In the above outlined case, in which it is desired to obtain a fabric which comprises areas dyed with different colours, the so-called "colour resist" is important, that is, the resistance opposed by each dye to become fixed to the yarn for which it is not intended. Thus, for example, a basic dye should become fixed to the dyeable basic yarn, rather than to the acidic dyeable yarn, and this, obviously, in order to prevent undesirable colour superpositions or others. It is thus required that the additives which impart to the yarns the dyeability with basic dyes possess and impart to the yarns in which they are incorporated a property of energetic repellency and refractoriness towards acidic dyes.

An object of the present invention is thus to provide a method for obtaining spinnable synthetic polymers, more particularly polyamides or copolyamides in which the above enumerated defects and drawbacks are obviated or strongly reduced in the fibres and yarns as produced with said polymers.

This invention also relates to spinnable synthetic polymers or polyamides or copolyamides as obtained with said method.

More particularly, synthetic polymers and polyamides or copolyamides as produced according to the invention possess a very high degree of dyeability with basic dyestuffs and, in addition, the colour hues as obtained after dyeing said polyamides according to the method of this invention are particularly brilliant and deep, the colours are fast (resistant) to washing, even repeated. Satisfactorily wide spectra can be obtained for the several colours.

In addition, the polymers or polyamides prepared according to this invention possess to a high degree the property of "colour resist," that is, the refractoriness towards acidic dyes.

According to the invention, such polymers or polyamides are obtained by employing, during progress of their preparation, preferably at the beginning and anyhow before their relative viscosity, as hereinafter defined, becomes greater than e.g., 1.5–2, quite particular additives which consist of aromatic aldehydes having the following general formula.

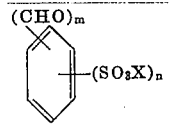

wherein $m$ and $n$ are 1 or 2, and the group $SO_3X$ indicates a free sulphonic group ($SO_3H$) or such a group as salified with the ammonium ion, or an alkali metal, or an alkaline earth metal, or an amine.

Among the compounds possessing the favourable properties according to the invention, there have been identified the alkali metal salts of 4-formyl-benzene-1:3-bisulphonic acid, more particularly the lithium salt:

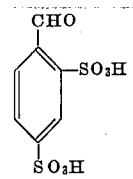

and the alkali metal salts (more particularly lithium salts) of the 2-formyl-benzene-1-sulphonic acid.

It has been ascertained that the lithium salts of such compounds give extremely satisfactory results, in that they are easily dispersed in the reaction mass. Compounds other than the alkali metal salts of the two compounds as mentioned above can also be successfully employed for the purposes of this invention, provided that they have the general formula reported above. The amounts of such additives range from 10 to 100 moles per $10^6$ grams of as obtained polymer and preferably from 30 to 60 grs. per $10^6$ grs. of said polymer. By so doing, a polymer is obtained, which displays very good basic dyeability properties as explained above. In spite of this, however, the polyamide as obtained, generally possesses a few undesirable yellow discolourations and it is thus advisable, in such a case, to introduce during the preparation, a further additive consisting of hypophosphorous acid or a metal hypophosphite, having the following formula:

$$MeH_2PO_2$$

wherein Me is an alkali metal (preferably lithium) in an amount which varies consistently with the employed aldehyde, but to be comprised in the range between 0.25 and 1 mol, and preferably between 0.4 and 0.7 mol per every mol of aldehyde employed.

Thus, whenever it is desired to obtain a polymer and, subsequently, a yarn whose dyeability is compatible with said dye, it will be sufficient to employ the aldehyde additive as mentioned above. On the contrary, whenever it is desired to obtain a polymer and a yarn intended for being dyed with a high chromatic purity, said phosphorous additive should be additionally employed.

In the light of the tests which have been carried out, it is surmised that the phosphorous additive may prevent the occurrence of yellowing discolourations in the polymer. The reasons for said yellowing discolouration are not known. It is surmised, however, that the hypophosphite does not play a role, as itself, in the dyeing process to a considerable degree since the polyamides as prepared with the aldehyde only, although they give fibres having a slight yellow hue, can be dyed with basic dyestuffs without troubles, whereas the hypophosphite, vention are generally added to the bulk of the compounds to be polymerized (monomer or monomers, according to the kind of polymer, more particularly polyamide or copolyamide which is to be prepared) at the start of polymerization, or, also, to the mass being reacted, within the previously indicated viscosity limits, during progress of the polymerization run.

The following examples are intended better to illustrate the procedures as adopted for carrying out the method according to the invention, without however, implying any limitation in the performance of said method.

EXAMPLE 1

In a bored aluminium block equipped with adjustable heating resistors, there have been introduced glass test tubes for polymerization containing each 100 grs. of caprolactam, 10 grs. water and 3 grs. of epsilon aminocaproic acid, as a catalyst.

To each test tube there have been subsequently added the additives as specified in Table 1. After scavenging with nitrogen, the mass has been heated during 2 hours to 240° C and then to 260° C for three additional hours, whereafter, during a further period of three hours, a gradual vacuum has been produced according to the prior art, until reaching a vacuum of 260 millimeters of mercury.

The polymers thus obtained have been ground and then refluxed with distilled water during twelve hours in order to wash out the monomer and the oligomers, whereafter the polymers have been dried in an evacuated oven overnight until obtaining a residual moisture of 0.08 percent or less.

The polymers have been spun in a specially provided microspinning machine so as to obtain a monofilament which, upon being cold drawn according to a ratio of 1 to 3.5 has given 5-denier threads. The threads so obtained have been placed in a dyeing bath and boiled during thirty minutes in a solution of distilled water containing the basic dye Blue Basacryl BASF in different, progressively increased amounts, until determining the maximum percentage amounts, as referred to 100 grs. of thread to be dyed, which are absorbed by the threads, leaving the dyeing baths wholly colourless. Said maximum percentages are reported in Table 1, in which also all the other results have been tabulated.

TABLE 1

| Test number | 1 | 2 | 3 | 4 | 5 | 6 | 7 |
|---|---|---|---|---|---|---|---|
| Additives: | | | | | | | |
| Sodium 4-formylbenzene-1:3-bisulphonate, mol. wt. 310. | 0.775 (25 m./t.) | 0.775 (25 m./t.) | 0.775 (25 m./t.) | 1.70 (55 m./t.) | | | |
| Sodium 2-formylbenzene-1-sulphonate, mol. wt. 208. | | | | | 1.15 (55 m./t.) | 0.85 (41 m./t.) | 1.50 (72 m./t.) |
| Adipic acid, mol. wt. 146 | | | 0.073 (5 m./t.) | 0.063 (4.3 m./t.) | 0.063 (4.3 m./t.) | 0.126 (8.6 m./t.) | 0.063 (4.3 m./t.) |
| Sodium hydroxide, mol. wt. 40 | | | 0.052 (13 m./t.) | | | | |
| Lithium carbonate, mol. wt. 74 | | | | 0.100 (13.5 m./t.) | 0.100 (13.5 m./t.) | 0.074 (10 m./t.) | 0.135 (18 m./t.) |
| Hypophosphorus acid (50% aqueous solution). | | 0.172 (13 m./t.) | 0.172 (13 m./t.) | 0.400 (30 m./t.) | 0.400 (30 m./t.) | 0.270 (20 m./t.) | 0.500 (38 m./t.) |
| Results: | | | | | | | |
| Rel. viscosity of the polymer, measured at 20° C. on a solution in sulphuric acid containing 1 gr. of polymer in 100 mls. | 2.85 | 2.58 | 2.50 | 2.05 | 2.72 | 2.64 | 2.30 |
| Percent absorption of Basacryl Blue BASF on the thread. | 1% | 0.5% | 1% | 1.5% | 1% | 1% | 1.2% |
| Colour of the microspun fibres prior to dyeing. | Slight yellow | White | White | White | White | White | White | alone, does not impart to the polymer any basic dyeability. The association of the aldehyde with the phosphorous additive is advisable whenever it is desired to have fibres which, in addition to being dyeable, have also a white colour. The additives according to the in- Note 1. The weights reported in the Table are in grams m/t means gram molecules per metric ton ($10^6$ grs.) of caprolactam mol.wt. means molecular weight.

Note 2. The additions of sodium hydroxide, or lithium carbonate have always been carried out by dissolving (outside the reaction environment) the base in the indicated amount of hypophosphorous acid and thus sodium or lithium hypophosphite addition were always in the question, according to the cases.

Note 3. Water (10 grs.) has been employed for dissolving the benzene-sulphonic acid salts which, thus, have been introduced as aqueous solutions to obtain a good homogeneousness of dispersion with no stirring.

The scrutiny of the table indicates the following:
a. The sodium 4-formylbenzene-1:3-bisulphonate employed alone gives good dyeability properties. However, it gives fibres having a slight yellow colour (see test No. 1).
b. The addition of the hypophosphorous ion gives fibres of a white colour. However, the addition of non-salified hypophosphorous acid gives rise to fibres having tinctorial properties which are lower than those of the fibres containing the salts of the same ac-id (see test 2).
c. The best results are obtained by using 4-formylbenzene-1:3-bisulphonate, or 2-formylbenzene-1-sulphonate along with hypophosphorous acid as salified with either sodium or lithium. This permits to obtain both the desired dyeability (the dyed threads show a deep shade) and the desired whiteness of the polymers (see tests from 3 to 7).
d. A few samples of threads, instead of being subjected to dyeing with basic dyestuffs, have been treated in a bath containing 1 percent with respect to the thread weight of Alizarine Blue R (Bayer), an acidic dyestuff. After the treatment, the threads did not show any appreciable dyeing.

EXAMPLE 2

In an autoclave adapted for polymerizing caprolactam, equipped according to the conventional art, three subsequent tests have been carried out, in each of which there are loaded 10 kgs. capro-lactam and 300 grs. water, whereafter the additives as listed in Table 2 are introduced.

TABLE 2

| Test Number | 8 | 9 | 10 |
|---|---|---|---|
| Additives | | | |
| Sodium 4-formylbenzene-1:3-bisulphonate | 93 (30 m/t) | 93 (30 m/t) | |
| Lithium 4-formylbenzene-1:3-bisulphonate | | | 186 (67 m/t) |
| Lithium carbonate | 5.55 (7.5 m/t) | 5.55 (7.5 m/t) | 11 (15 m/t) |
| Hypophosphorous acid (50% aqueous solution) | 20 (15 m/t) | 20 (15 m/t) | 40 (30 m/t) |
| Adipic acid | 22.5 | 31.5 | 11 |
| RESULTS ACHIEVED | | | |
| Rel. viscosity of polymer (1% in water) | 2.87 | 2.69 | 2.30 |
| % Absorption of Blue Basacryl BASF on thread | 1% | 1% | 1.5% |
| Colour of the spun fibres 40/10 | white | white | white |
| Tensile strength, grs. per denier | 5.6 | 5.3 | 4.3 |

The polymerization in the tests has always been carried out in the same manner, by using the following conditions:
Polymerization temperature: 262° C
Pressure from 3 atmospheres to 1 atmosphere during 3 hours. From 1 atmosphere to 260 mms. of mercury (residual pressure) during 3 hours.

The polymer has been extruded, cut in cylindrical flakes, washed with distilled water during 12 hours, dried to a moisture contents of less than 0.09 percent water on the polymer and spun through a spinneret so as to have a textile yarn with a denier count of 40/10. The yarn has been woven and dyed with a dye bath containing Blue Basacryl BASF according to the procedure of example 1. The percentage of dyestuff as absorbed by the thread are as shown in Table 2.

The fabric has been entirely dyed and the dye bath has been completely depleted from the dye. Prior to dyeing, the fibres had a beautiful white colour.

Note 1. The additives have been added to the lactam as an aqueous solution, using 300 mls. water. This in order to have a good homogeneousness also in autoclaves which are not equipped with a stirrer. Hypophosphorous acid has been employed after having added lithium carbonate to the acid, that is, it has been employed as lithium hypophosphite. The symbols used have the same meaning as those of example 1.

Note 2. The yarns obtained were extremely regular and with few faults. The number of lumps or defects as measured with a slub-catcher (a device for controlling the regularity of the count of yarn) equalized that of the polymers stabilized with acetic acid and thus was satisfactory.

Note 3. A fabric prepared with the 40/10 yarn of test No. 9 and with a conventional polyamide-6 yarn dyeable with acidic dyestuffs, has been treated in a bath containing 1 percent with respect to the yarn of the acidic dyestuff Alizarine Blue R (Bayer). The fabric has shown that the colour resist effect, that is the effect of repellency of the yarn containing 4-formyl bisulphonate with respect to the acidic dye is particularly satisfactory. This property is extremely desirable in dyeing with bicolour effect acidic dye-basic dye. It has been observed, furthermore, that also the yarns as obtained in the other tests have a good repellency towards the acidic dyes.

What is claimed is:
1. In a method for producing polyamides having a high affinity towards basic dyes, the improvement which comprises introducing before the end of the polymerization reaction of the spinnable polyamide an additive which consists of an aromatic aldehyde having the general formula

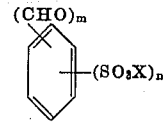

wherein $m$ and $n$ are 1 or 2 and the group $SO_3X$ indicates either a sulphonic free grouping or a sulphonic grouping salified with the ammonium ion or with an alkali metal or an alkaline earth metal, or with an amine.

2. A method according to claim 1, wherein the additive is added to the polyamide monomer at the beginning of the polymerization.

3. A method according to claim 1, wherein there are used from 10 to 100 mols of aldehyde per $10^6$ grams of polymer obtained.

4. A method according to claim 1, wherein also hypophosphorous acid or an hypophosphite of an alkali metal is added in an amount ranging from 0.25 mol to 1 mol, per each mol of aldehyde added.

5. A method according to claim 1, wherein the added aldehyde is 4-formylbenzene-1:3-bisulphonic acid or the alkali metal salts thereof.

6. A method according to claim 1, wherein the added aldehyde is 2-formyl-benzene-1-sulphonic acid or the alkali metal salts thereof.

7. A method according to claim 4, wherein lithium hypophosphite is used.

8. A method according to claim 1 wherein the produced polyamide is polycapronamide (nylon-6) or hexamethylene diamine polyadipate (nylon 66).

9. A polyamide prepared by the process of claim 1.

10. A polyamide prepared by the process of claim 4.

11. A polyamide prepared by the process of claim 8.

* * * * *